United States Patent [19]

Blumenthal et al.

[11] Patent Number: 5,454,592
[45] Date of Patent: Oct. 3, 1995

[54] APPARATUS AND METHOD FOR INFLATING AN INFLATABLE VEHICLE OCCUPANT RESTRAINT

[75] Inventors: Jack L. Blumenthal, Los Angeles, Calif.; Peter Staudhammer, Mayfield Hts., Ohio

[73] Assignee: TRW Vehicle Safety Systems Inc., Lyndhurst, Ohio

[21] Appl. No.: 166,521

[22] Filed: Dec. 13, 1993

[51] Int. Cl.⁶ .................................................. B60R 21/26
[52] U.S. Cl. .............................. 280/737; 222/5; 137/68.2
[58] Field of Search ................................... 280/737, 736, 280/741, 742; 222/5, 3; 137/68.2

[56] References Cited

U.S. PATENT DOCUMENTS

| | | | |
|---|---|---|---|
| 3,642,304 | 2/1972 | Johnson et al. | 280/737 |
| 3,806,153 | 4/1974 | Johnson | 280/737 |
| 3,836,170 | 9/1974 | Grosch et al. | 280/737 |
| 3,854,491 | 12/1974 | Bryan et al. | 280/737 |
| 3,897,962 | 8/1975 | Sack | 280/736 |
| 3,966,228 | 6/1976 | Neuman | 280/737 |
| 4,131,300 | 12/1978 | Radke et al. | 280/737 |
| 5,076,607 | 12/1991 | Woods et al. | 280/737 |
| 5,230,531 | 7/1993 | Hamilton et al. | 280/737 |
| 5,242,194 | 9/1993 | Popek | 280/737 |
| 5,263,740 | 11/1993 | Frey et al. | 280/737 |
| 5,273,312 | 12/1993 | Coultas et al. | 280/737 |
| 5,290,060 | 3/1994 | Smith | 280/737 |

FOREIGN PATENT DOCUMENTS 4231356  4/1993  Germany.

OTHER PUBLICATIONS

Shames, Irving H., Mechanics of Fluids, McGraw–Hill Book Company, 1982, pp. 190–193.
Kundu, Pijush K., Fluid Mechanics, Academic Press, Inc., 1990, pp. 110–112.

Primary Examiner—Karin L. Tyson
Assistant Examiner—Peter C. English
Attorney, Agent, or Firm—Tarolli, Sundheim & Covell

[57] ABSTRACT

An inflator assembly (10) for inflating an inflatable vehicle occupant restraint (12) includes a pressure vessel (14) with a storage chamber (18) containing a combustible mixture of gases. An ignitable material (122), when burning, increases the pressure of the mixture of gases by igniting the mixture of gases. The mixture of gases is released to exit the storage chamber (18) at a first flow rate and subsequently at a second, greater flow rate. A first gas outlet opening (172) is provided in the pressure vessel (14) when the inflator assembly (10) is actuated, and a second gas outlet opening (186) is subsequently provided in the pressure vessel (14) at a predetermined time. A diffuser (176) directs gas from the gas outlet openings (172) and (186) into the inflatable vehicle occupant restraint (12).

36 Claims, 5 Drawing Sheets

APPARATUS AND METHOD FOR INFLATING AN INFLATABLE VEHICLE OCCUPANT RESTRAINT

FIELD OF THE INVENTION

The present invention relates to an apparatus and method for inflating an inflatable vehicle occupant restraint, such as an air bag.

BACKGROUND OF THE INVENTION

A known apparatus for inflating an inflatable vehicle occupant restraint, such as an air bag, includes a pressure vessel for storing a quantity of inflation fluid under pressure. The pressure vessel includes a burst disk which is ruptured in response to vehicle deceleration of a magnitude indicating the occurrence of a collision. When the burst disk is ruptured, it defines an outlet opening through which the inflation fluid flows from the pressure vessel toward the vehicle occupant restraint to inflate the vehicle occupant restraint. The area of the opening defined by the ruptured burst disk is a factor in determining the rate at which the inflation fluid flows into the vehicle occupant restraint.

SUMMARY OF THE INVENTION

In accordance with the present invention, an apparatus for inflating an inflatable vehicle occupant restraint, such as an air bag, comprises a pressure vessel means and an igniter means. The pressure vessel means defines a chamber for containing gas under pressure. A combustible mixture of gases is contained in the chamber. The igniter means increases the pressure of the mixture of gases by igniting the mixture of gases.

In accordance with a principal feature of the present invention, the apparatus further includes an outlet means for releasing gas to exit the chamber. The outlet means releases the gas to exit the chamber at a first flow rate and subsequently at a second, greater flow rate. The outlet means provides a first gas outlet opening in the pressure vessel means to open the pressure vessel means when the outlet means is actuated. The outlet means provides a second gas outlet opening in the pressure vessel means at a predetermined time after providing the first gas outlet opening. A directing means directs gas from the gas outlet openings into the vehicle occupant restraint.

In a preferred embodiment of the present invention, the first and second gas outlet openings have predetermined flow areas. The apparatus thus controls the magnitudes of the first and second flow rates, as determined by the flow areas, in addition to controlling the timing of the first and second flow rates. By controlling the magnitudes and the timing of the first and second flow rates at which the gas is released to exit the chamber, the apparatus controls the rate at which the gas is directed into the vehicle occupant restraint to inflate the restraint.

In accordance with another principal feature of the present invention, the pressure vessel means includes a closure wall. The closure wall has a break away portion which is urged to move from the closure wall by the gas pressure inside the chamber. The break away portion of the closure wall has a predefined peripheral boundary which is defined by a rupturable portion of the closure wall.

The rupturable portion of the closure wall is ruptured by the gas pressure when the gas pressure is increased by the igniter means. The rupturable portion of the closure wall thus releases the break away portion to separate completely from the closure wall at the predefined peripheral boundary of the break away portion, and to move away from the closure wall to form a gas outlet opening within the predefined peripheral boundary. In the preferred embodiment of the present invention, the gas outlet opening formed within the predefined peripheral boundary of the rupturable portion of the closure wall is the second gas outlet opening, and is thus formed at the predetermined time following formation of the first gas outlet opening.

The preferred embodiment of the present invention further includes a surface means for defining the second gas outlet opening as a rounded orifice having a coefficient of contraction of at least about 0.90 and preferably about 0.97–0.98. The second gas outlet opening is thus designed to direct gas outward from the chamber in the form of a jet which is not substantially contracted relative to the flow area of the second gas outlet opening. This enables a maximum outward flow rate for the gas which emerges from the chamber through the second gas outlet opening to inflate the inflatable vehicle occupant restraint.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
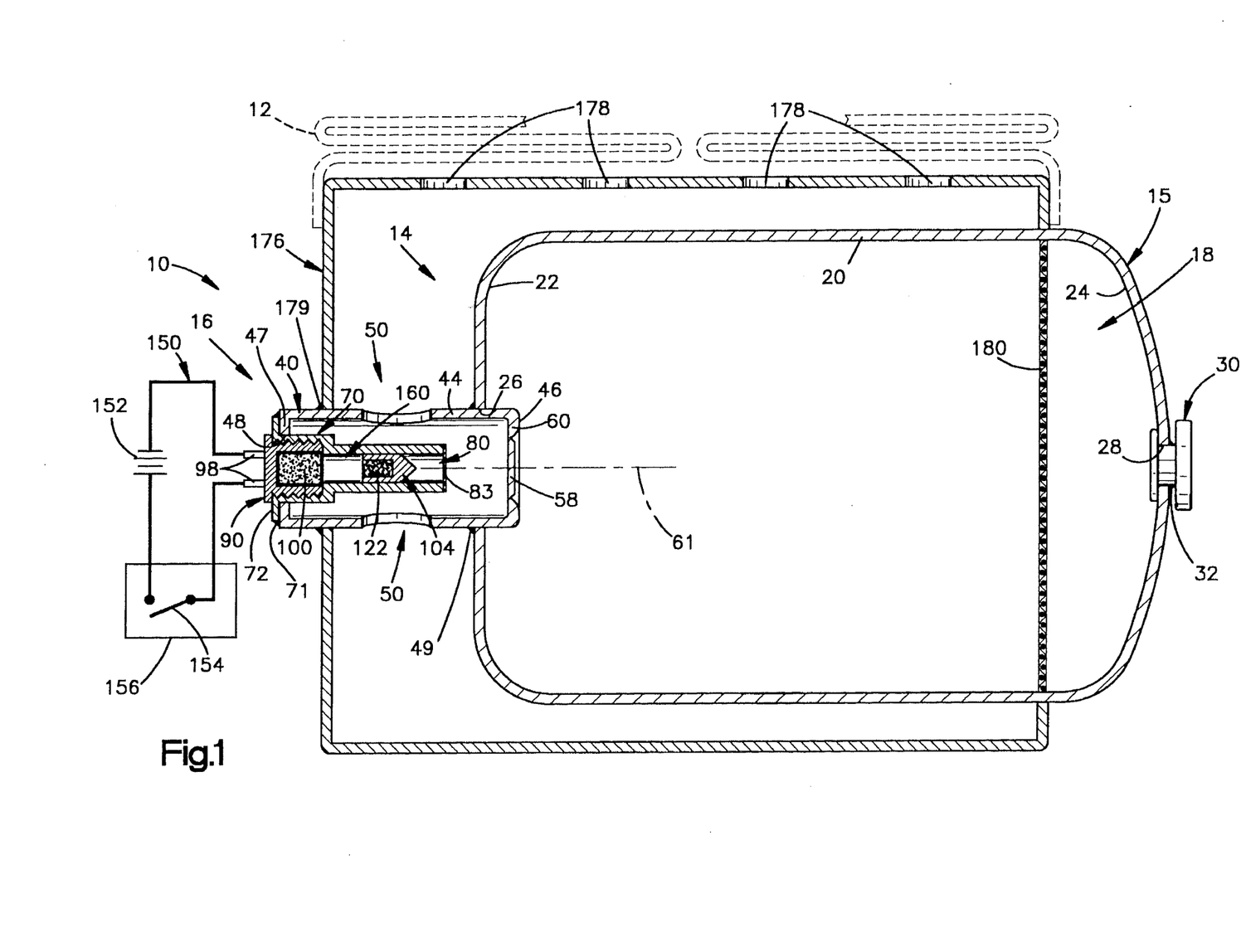
FIG. 1 is a schematic view of an inflator assembly constructed in accordance with the present invention, showing the inflator assembly in an unactuated condition.
Figure 6:
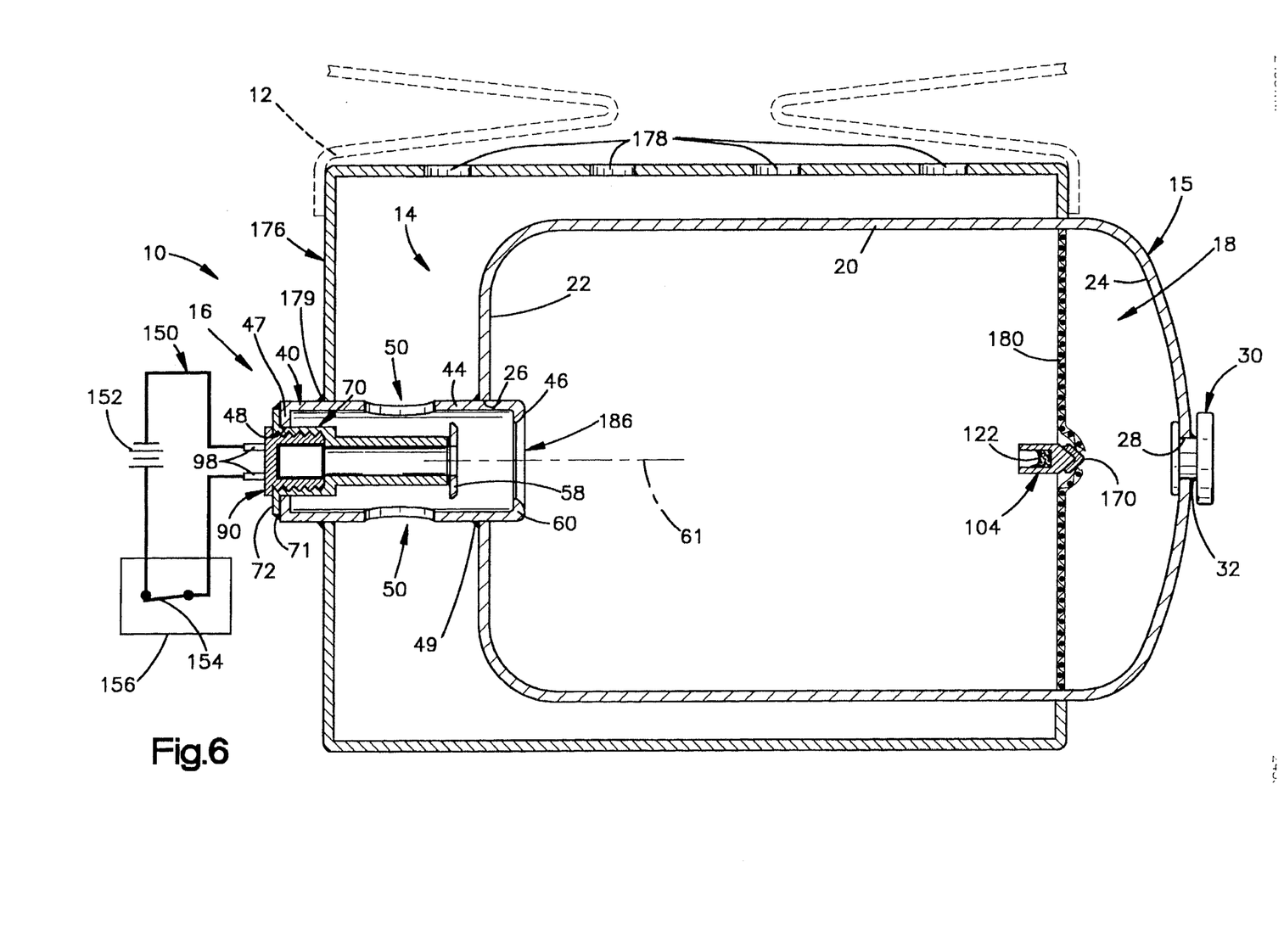
FIG. 6 is a view similar to FIG. 1 showing the inflator assembly in an actuated condition.

An inflator assembly 10 constructed in accordance with the present invention is shown schematically in FIG. 1. The inflator assembly 10 provides inflation fluid for inflating an inflatable vehicle occupant restraint which, in the preferred embodiment of the invention shown in the drawings, is an air bag 12. The inflator assembly 10 has an unactuated condition in which the air bag 12 is in a stored, folded condition, as shown in FIG. 1. The inflator assembly 10 also has an actuated condition in which it inflates the air bag 12, as shown in FIG. 6. The inflator assembly 10 is actuated in response to vehicle deceleration of at least a predetermined magnitude which indicates the occurrence of a vehicle collision. The air bag 12 is then inflated from the stored, folded condition to an inflated condition in which it restrains movement of a vehicle occupant and protects the occupant from forcibly striking parts of the vehicle.

The inflator assembly 10 comprises a pressure vessel 14. The pressure vessel 14 includes a tank member 15 and an actuator assembly 16. The tank member 15 and the actuator assembly 16 together define a sealed storage chamber 18 containing inflation fluid, such as gas, for inflating the air bag 12. The actuator assembly 16 opens the pressure vessel 14 to release the inflation fluid from the storage chamber 18 upon the occurrence of vehicle deceleration of at least the predetermined magnitude which indicates the occurrence of a vehicle collision.

The tank member 15 has a cylindrical side wall portion 20, a first end wall portion 22 and a second end wall portion 24. The first end wall portion 22 of the tank member 15 has an annular inner edge surface 26 defining an opening extending through the first end wall portion 22. The second end wall portion 24 of the tank member 15 has an annular inner edge surface 28 which similarly defines an opening extending through the second end wall portion 24. An end cap 30 is closely received through the opening in the second end wall portion 24. A weld 32 blocks leakage of the inflation fluid from the storage chamber 18 between the edge surface 28 and the end cap 30. The end cap 30 has a passage (not shown) through which the inflation fluid is conducted into the storage chamber 18. After the storage chamber 18 is filled with inflation fluid at a desired pressure, the passage in the end cap 30 is closed. The end cap 30 may also include a conventional pressure switch (not shown) which monitors the fluid pressure in the storage chamber 18 to alert an occupant of the vehicle if the fluid pressure drops below a predetermined level.

The inflation fluid in the storage chamber 18 preferably comprises a combustible mixture of gases. The combustible mixture of gases in the storage chamber 18 includes a primary gas, which comprises the majority of the gas for inflating the air bag 12, and a combustible gas which, when ignited, heats the primary gas. The mixture of gases is in a homogeneous gaseous state. The primary gas preferably includes an oxidizer gas for supporting combustion of the combustible gas and an inert gas for inflating the air bag 12. The primary gas may include air or a mixture of air and an inert gas. The inert gas may be nitrogen, argon or a mixture of nitrogen and argon. Preferably, the primary gas is air and the oxidizer gas is the oxygen in the air. The combustible gas may be hydrogen, methane or a mixture of hydrogen and methane. Preferably, the combustible gas is hydrogen. A typical composition of the mixture of gases is about 12% by volume hydrogen and 88% by volume air. The mixture of gases is stored in the storage chamber 18 at a pressure of approximately 2,500 psi, but could be stored in the storage chamber 18 at a different pressure.

The actuator assembly 16 includes a manifold 40. The manifold 40 has a cylindrical side wall 44, a circular closure wall 46 at one end of the side wall 44, and a circular outer wall 47 at the other end of the side wall 44. The outer wall 47 of the manifold 40 has an annular inner edge surface 48 defining an opening extending through the outer wall 47. The side wall 44 of the manifold 40 is closely received in and extends through the opening in the first end wall portion 22 of the tank member 15. A weld 49 blocks leakage of the gas from the storage chamber 18 between the edge surface 26 and the side wall 44. A plurality of gas flow openings 50 extend through the side wall 44.

The closure wall 46 has a predefined central break away portion 58 and an annular rim portion 60, both of which are centered on an axis 61. As shown in enlarged detail in FIG. 2, the rim portion 60 has an outer side surface 62, and has an inner side surface 64 with an annular edge 65 circumscribing the break away portion 58. The break away portion 58 has an outer side surface 66, and has an inner side surface 68 with a circular peripheral edge 69 adjoining the annular edge 65 of the rim portion 60. The edges 65 and 69 converge to define a stress riser in the material of the closure wall 46 which interconnects the break away portion 58 with the rim portion 60. The juncture of the edges 65 and 69 thus defines a ring-shaped boundary at which the break away portion 58 of the closure wall 46 may break away from the rim portion 60.

When the storage chamber 18 is filled with a mixture of gases as described above, the pressure of the stored mixture of gases acts axially outward against the inner side surface 68 of the break away portion 58 of the closure wall 46. The ambient air pressure simultaneously acts axially inward against the outer side surface 66 of the break away portion 58. As a result, the break away portion 58 is subjected to a gas pressure differential between the pressure of the stored mixture of gases and the ambient air pressure. Since the pressure of the stored mixture of gases is higher than the ambient air pressure, the gas pressure differential results in a pressure force urging the break away portion 58 to move axially outward. The material of the closure wall 46 which comprises the stress riser interconnecting the break away portion 58 with the rim portion 60 is designed to rupture under the stress induced by the pressure force acting axially outward when the pressure force reaches a predetermined elevated level.

An actuator housing 70 is supported in the manifold 40. The actuator housing 70 is a tubular member centered on the axis 61. As shown in FIGS. 1 and 6, the actuator housing 70 is closely received through the opening in the outer wall 47 of the manifold 40. A weld 71 blocks leakage of gas between the outer wall 47 and a flange 72 on the actuator housing 70. As shown in enlarged detail in FIG. 2, the actuator housing 70 has a base portion 73 and a guide portion 74. The base portion 73 includes the flange 72, and has a threaded inner surface 75 which defines a cylindrical base compartment 76. The guide portion 74 has an annular end surface 78 and a smooth cylindrical inner surface 79. The annular end surface 78 defines a circular opening 80. The cylindrical inner surface 79 defines a guide passage 82 extending axially through the guide portion 74 from the base compartment 76 to the opening 80. A suitable piece of tape 83 is adhesively connected to the annular end surface 78 to cover and seal the opening 80.

Figure 2:
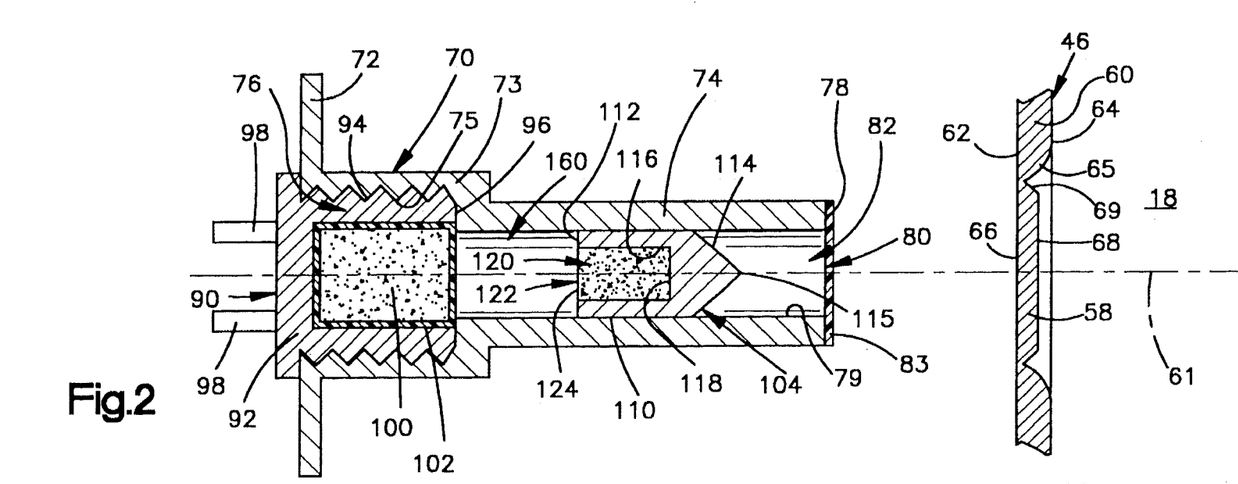
FIG. 2 is an enlarged view of parts of the inflator assembly of FIG. 1.

As further shown in enlarged detail in FIG. 2, a squib 90 is supported within the actuator housing 70. The squib 90 has a cylindrical casing 92. The casing 92 has a threaded outer surface 94, and has an annular front end surface 96 defining an opening at the front end of the squib 90. A pair of electrically conductive pins 98 extend into the casing 92. The casing 92 contains a pyrotechnic charge 100 in an envelope 102 which is hermetically sealed. The pyrotechnic charge 100 is ignited upon the passage of electric current through the squib 90 between the pins 98. The pyrotechnic charge 100 is preferably $ZrKClO_4$, but other known pyrotechnic charge materials can be used in the squib 90. When the pyrotechnic charge 100 in the squib 90 is ignited, it produces combustion products which rupture the envelope 102 to open the hermetic seal and emerge through the opening at the front end surface 96 of the squib 90.

The casing 92 is screwed into the base compartment 76 of the actuator housing 70 with the opening at the front end surface 96 facing the guide passage 82. The threaded surfaces 75 and 94 are engaged with each other closely and tightly enough to block leakage of gas between the threaded surfaces 75 and 94. Alternatively, a weld or other seal could be provided for sealing and holding the squib 90 in place.

The squib 90 is thus supported by the actuator housing 70 in a position to direct the combustion products from the pyrotechnic charge 100 into the guide passage 82 in a direction extending along the axis 61.

Also, as shown in FIG. 2, the actuator assembly 16 further includes a movable container 104 in the form of a projectile member. The movable container 104 has a cylindrical outer side surface 110, an annular rear end surface 112, and a conical front end surface 114. In the preferred embodiment of the invention shown in the drawings, the cylindrical outer side surface 110 of the movable container 104 has a diameter of 0.15 in. The conical front end surface 114 extends away from the cylindrical outer side surface 110 to form a pointed tip portion 115 of the movable container 104.

The movable container 104 further has a cylindrical inner surface 116 and a circular inner surface 118. The inner surfaces 116 and 118 are coaxial with the outer side surface 110, and together define a compartment 120 within the movable container 104. The compartment 120 has a cylindrical shape, with an open end at the annular rear end surface 112 and a closed end at the circular inner surface 118.

An ignitable material 122 is contained within the compartment 120 in the movable container 104. The ignitable material 122 is preferably $BKNO_3$, but, as with the pyrotechnic charge 100, other materials can be used as alternatives. In the preferred embodiment of the invention shown in the drawings, the ignitable material 122 fills the compartment 120 and has a surface 124 extending across the open end of the compartment 120. The ignitable material 122 (like the ignitable material 100) preferably is protected from environmental conditions such as moisture. Such protection could be accomplished by a cap or a cover in the nature of a shell or possibly a wax coating (none of which are shown in the drawings) which covers the surface 124 at the open end of the compartment.

When the inflator assembly 10 is in the unactuated condition shown in FIG. 1, the movable container 104 is located within the actuator housing 70. Specifically, the movable container 104 has an unactuated position in which it is closely received coaxially within the guide passage 82 in the guide portion 74 of the actuator housing 70. When the movable container 104 is located in its unactuated position, the cylindrical outer side surface 110 of the movable container 104 is closely received against the cylindrical inner surface 79 of the guide portion 74 with a releasable interference fit. The interference fit can be supplemented with a crimp in the guide portion 74 of the actuator housing 70, or with a shear pin or the like. Additionally, the surface 124 of the ignitable material 122 faces axially toward the opening at the front end surface 96 of the squib 90.

The actuator assembly 16 further includes an electrical circuit 150. The electrical circuit 150 includes a power source 152, which is preferably the vehicle battery and/or a capacitor, and a normally open switch 154. The switch 154 is preferably part of a vehicle deceleration sensor 156. The deceleration sensor 156 senses vehicle deceleration of at least a predetermined magnitude which is indicative of a collision, and closes the switch 154 in response to such vehicle deceleration. Such a deceleration sensor is known in the art. The electrical circuit 150 extends through the squib 90 between the pins 98, and actuates the squib 90 when the switch 154 closes.

When the vehicle experiences deceleration of at least the predetermined magnitude indicative of a collision, the deceleration sensor 156 senses the occurrence of such vehicle deceleration and closes the switch 154. When the switch 154 closes, electric current passes through the squib 90 between the pins 98. The pyrotechnic charge 100 in the squib 90 is then ignited, and produces combustion products which rupture the envelope 102 and emerge from the squib 90. The combustion products emerging from the squib 90 move into a space 160 in the guide passage 82 between the squib 90 and the movable container 104, and move axially across the space 160 to the movable container 104. When the combustion products from the squib 90 reach the movable container 104, they ignite the ignitable material 122 in the compartment 120 at the surface 124. The ignitable material 122 then produces combustion products which are emitted from the open end of the compartment 120 and directed into the space 160. Any environmental protection over the surface 124 is destroyed.

When the pyrotechnic charge 100 and the ignitable material 122 are burning, the combustion products are initially contained in the space 160 between the squib 90 and the movable container 104. The gaseous components of the combustion products in the space 160 increase in pressure as the pyrotechnic charge 100 and the ignitable material 122 burn. The squib 90 is securely held in the base compartment 76 by the engaged threads. However, the movable container 104 is releasably held in the guide passage 82 by the interference fit.

When the increasing gas pressure in the space 160 reaches a predetermined elevated level, the force of the gas pressure acting axially against the movable container 104 becomes great enough to overcome the interference fit. The force of the gas pressure then propels the movable container 104 outward of the guide passage 82 from its unactuated position toward the opening 80 at a high velocity. The movable container 104 comprises a mass having an amount of kinetic energy when the movable container 104 is propelled at the high velocity. The kinetic energy of the movable container 104 is sufficient to enable the movable container 104 to break through the tape 83 and move outward through the opening 80 toward the closure wall 46.

Figure 3:
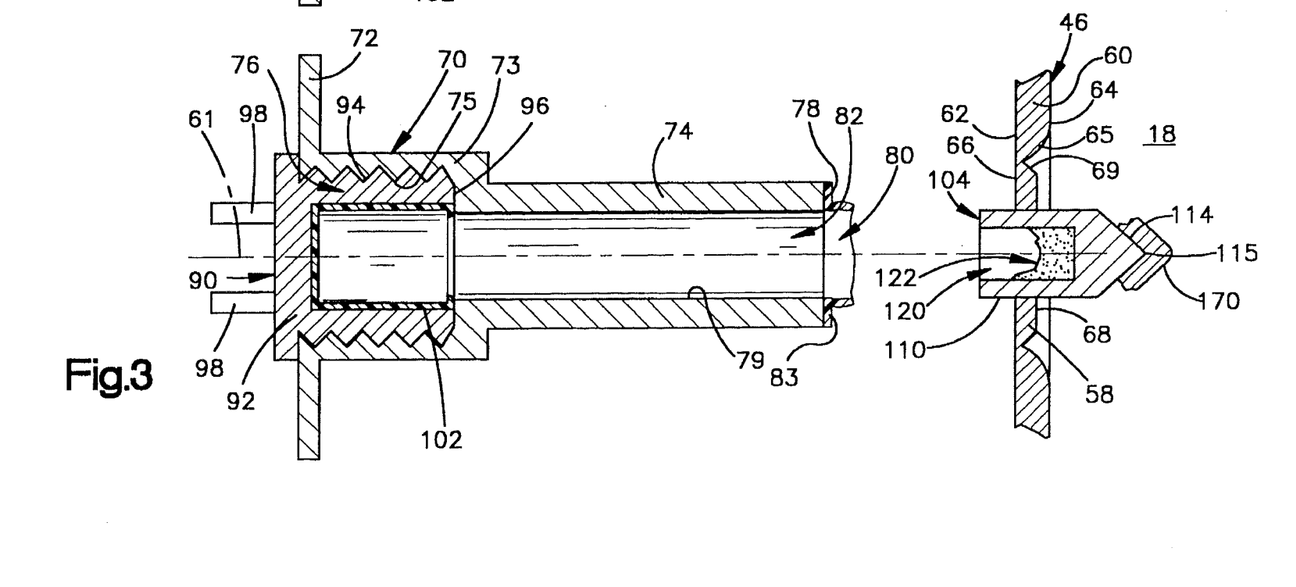
FIG. 3 is a view similar to FIG. 2 showing parts in different positions.
Figure 4:
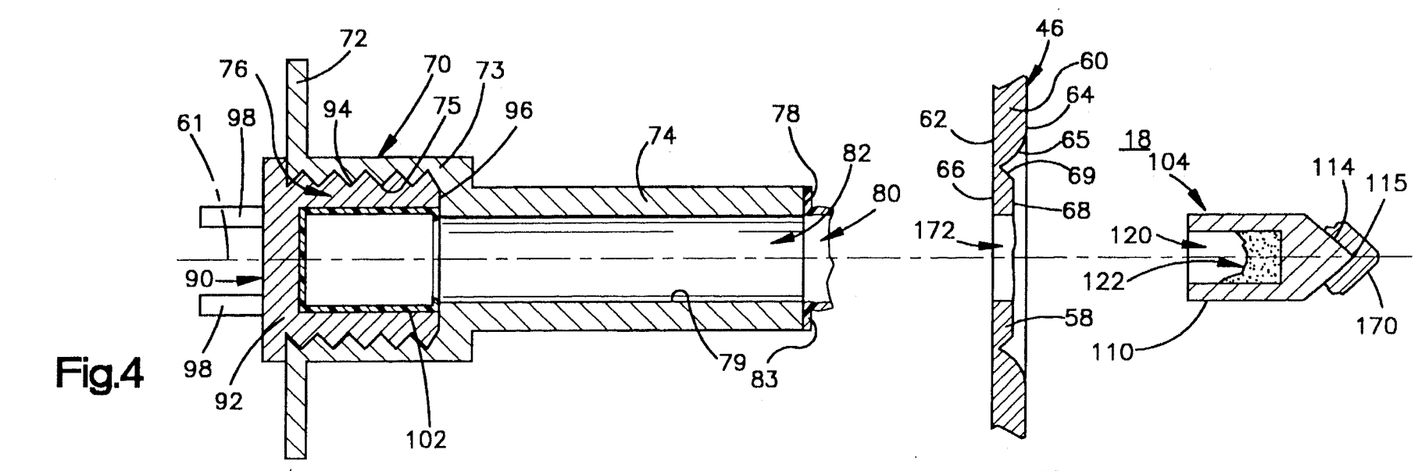
FIG. 4 is a view similar to FIG. 3 showing parts in other positions.

The kinetic energy of the movable container 104 is further sufficient to enable the movable container 104 to penetrate and sever a part 170 of the break away portion 58 of the closure wall 46 so as to form a hole 172 through the break away portion 58, as shown in FIGS. 3 and 4. Most preferably, the kinetic energy of the movable container 104 is great enough for the movable container 104 to shear the part 170 from the break away portion 58 so as to puncture the hole 172 in a circular shape with a diameter substantially equal to the diameter of the cylindrical outer surface 110 of the movable container 104.

The hole 172 is a first orifice through which the mixture of gases in the storage chamber 18 exits the storage chamber 18. The flow area of the first orifice 172 has a predetermined value substantially equal to the cross sectional area of the movable container 104, which in the preferred embodiment of the invention is 0.018 sq. in. The mixture of gases is ignited by the hot products of combustion produced by the actuator assembly 16, combusts, and flows outward through the first orifice 172 and further through the manifold 40 to the gas flow openings 50. A diffuser 176 with a plurality of gas exit openings 178 then directs the gas to flow from the gas flow openings 50 to the air bag 12. A weld 179 between the diffuser 176 and the manifold 40 blocks leakage of the gas flowing through the diffuser 176.

After the movable container 104 punctures the first orifice 172 through the break away portion 58 of the closure wall 46, the movable container 104 continues to move to the right, as viewed in the drawings, into the storage chamber 18. The movable container 104 thus carries the ignitable material 122, as well as the severed part 170 of the break away portion 58, into the mixture of gases in the storage chamber 18 when the ignitable material 122 is burning. The combustion products generated by the ignitable material 122 include heat, hot particles and hot gases. Those combustion products continue to be emitted from the compartment 120 in the movable container 104 as the movable container 104 moves through the mixture of gases. The combustion products are thus dispersed in the mixture of gases sufficiently to further ignite the combustible gas in the mixture rapidly throughout the storage chamber 18.

As shown in FIG. 6, the movable container 104 is preferably propelled through the storage chamber 18 along the axis 61 from the closure wall 46 nearly to the second end wall portion 24 of the tank member 15. The ignitable material 122 preferably continues to spew combustion products into the mixture of gases until the movable container 104 reaches the far end of the storage chamber 18. An optional screen 180 may be included inside the storage chamber 18 adjacent the second end wall portion 24 of the tank member 15. The screen 180 would be punctured by the movable container 104, and would capture the movable container 104 at the far end of the storage chamber 18, as shown in FIG. 6. The screen 180 would also capture the severed part 170 of the break away portion 58 of the closure wall 46 which is carried by the movable container 104.

When the combustible gas burns during its exit from or in the storage chamber 18, it generates heat and gaseous products of combustion which increase the temperature and pressure of the mixture of gases. For example, in a test apparatus including a pressure vessel with a storage chamber like the storage chamber 18, the pressure of the mixture of gases was increased from an initial storage pressure of approximately 2,000–2,500 psi to an elevated pressure of approximately 4,500–5,500 psi.

Figure 5:
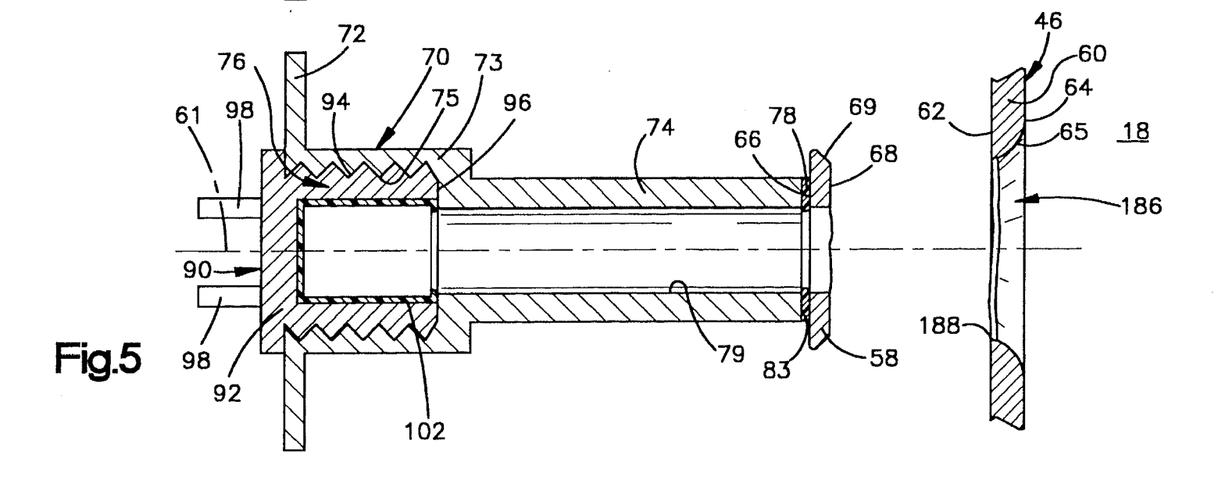
FIG. 5 is a view similar to FIG. 4 showing parts in yet other positions.

Although the mixture of gases is already beginning to combust and flow outward from the storage chamber 18 through the first orifice 172 while the pressure is being increased inside the storage chamber 18, the break away portion 58 of the closure wall 46 continues to be subjected to a gas pressure differential between the side surfaces 66 and 68. Accordingly, the gas pressure differential across the break away portion 58 increases with the increasing pressure inside the storage chamber 18. When the gas pressure differential reaches a predetermined elevated level, the resulting pressure force acting axially outward against the break away portion 58 reaches a corresponding predetermined elevated level. The material of the closure wall 46 which comprises the stress riser interconnecting the break away portion 58 with the rim portion 60, as described above, then ruptures under the stress induced by the pressure force. When the material of the closure wall 46 ruptures, the break away portion 58 is released for movement axially outward from the closure wall 46 and into the manifold 40 under the influence of the gas flowing outward from the storage chamber 18. A second hole 186 through the closure wall 46 is thus formed, as shown in FIG. 5. The second hole 186 has a circular shape and diameter matching the circular shape and diameter of the periphery of the break away portion 58.

The second hole 186 is a second orifice through which gas exits the storage chamber 18. Since the second orifice 186 is substantially larger than the first orifice 172, the flow rate outward through the second orifice 186 is substantially greater than the flow rate at which the gas previously flowed outward through the first orifice 172. The flow rate is further increased by the increased pressure attained by the mixture of gases at the time when the second orifice 186 is formed. The mixture of gases which has been pressurized upon burning of the combustible gas thus rushes quickly outward from the storage chamber 18 to inflate the air bag 12.

Another factor that affects the flow rate outward through the second orifice 186 is the configuration of the surfaces of the closure wall 46 which define the second orifice 186. Specifically, the rim portion 60 of the closure wall 46 has an annular surface 188 which is formed at the ruptured boundary of the break away portion 58. The annular surface 188 defines the outlet area of the second orifice 186. The outlet area of the second orifice 186 thus has a predetermined value equal to the area within the boundary of the break away portion 58 of the closure wall 46, which in the preferred embodiment of the invention is 0.173 sq. in. The annular edge 65 of the inner side surface 64, which circumscribes the boundary of the break away portion 58, also partly defines the second orifice 186. The edge 65 is tapered, with its greatest diameter at the planar portion of the inner side surface 64 and its smallest diameter at the annular surface 188. The second orifice 186 thus has a decreasing area as it extends outward from the storage chamber 18. Also, the edge 65 has a rounded radial profile which defines the second orifice 186 as a rounded rather than a square edged orifice. Therefore, the area of the jet of gas emerging from the second orifice 186 is not contracted as it would be if the second orifice 186 were a square edged orifice.

In the preferred embodiment of the invention, the rounded shape of the edge 65 results in a coefficient of contraction of at least about 0.90 and preferably about 0.97–0.98. In comparison with a square edged orifice, which would have a coefficient of contraction of about 0.61, the rounded orifice 186 thus enables a maximum outward flow rate for the mixture of gases which has been pressurized by combustion in the storage chamber 18.

The break away portion 58 of the closure wall 46 is moved into the manifold 40 when the second orifice 186 is formed, as shown in FIGS. 5 and 6. The gas flowing outward through the manifold 40 must move through the annular space between the actuator housing 70 and the side wall 44 of the manifold 40. Therefore, it is desirable for the break away portion 58 not to impede the flow of gas through the manifold 40. The break away portion 58, the actuator housing 70, and the side wall 44 are sized accordingly so that a sufficient annular flow area is provided radially between the peripheral edge 69 of the break away portion 58 and the side wall 44, even if the break away portion 58 moves into the position of maximum blockage shown in FIG. 5. That annular flow area is greater than the outlet area of any other orifice, including the second orifice 186. For example, in the preferred embodiment of the invention shown in the drawings, an annular flow area of at least 0.266 sq. in. surrounds the break away portion 58, which has an outer diameter of 0.470 in. That annular flow area is greater than the outlet area of the second orifice 186, which is 0.173 sq. in.

Some particular advantages of the present invention result when the stress riser defined by the edges 65 and 69 of the closure wall 46 (FIG. 2) is placed at a radial location such that the force from the gas pressure in the storage chamber 18 causes shear stress, but no bending stress, in the closure wall 46 at the location of the stress riser. The force from the gas pressure within storage chamber 18 acts on the closure wall 46, forcing the closure wall 46 outward from the storage chamber 18. The closure wall 46 in turn is restrained from motion at its periphery, where it is joined to the thicker and structurally stronger cylindrical side wall 44. The stresses induced in the closure wall 46 by the gas pressure and by the circumferential restraint provided by the cylindrical side wall 44 are complex and vary with radial distance from the axis 61.

In general, at any point on the wall closure 46 there is a shear force as well as a bending moment. In the circular geometry of the wall closure 46, the shear force at any radial distance from the axis 61 is equal to the gas pressure in the storage chamber 18 times the area of the portion of the closure wall 46 within that radial distance. The bending moment varies with radial distance in a more complex fashion. It has a maximum value at the axis 61, and decreases with increasing radial distance to a value of zero at a critical radius. The bending moment then increases in a negative sense, as compared with the bending moment at the axis 61, toward the periphery of the closure wall 46 at the circular side wall 44. For a perfectly circular wall made of a material with a Poisson's ratio of 0.3 and rigidly restrained by a fully rigid surrounding wall, the critical radius is at 63% of the full radius of the circular wall. However, the location of the critical radius at which the bending moment is zero can be affected by the rigidity with which the circular wall is restrained by the surrounding wall and by the thickness profile of the circular wall, if it is not uniform. For the closure wall 46, the location of the critical radius can be determined empirically. Locating the stress riser in the closure wall 46 at or near the critical radial position at which the bending moment is at or near zero imposes only shear stress, but no or a minimal bending stress in the stress riser.

The performance of the inflator assembly 10 can be controlled in a number of different ways. For example, the amounts and compositions of the pyrotechnic charge 100 in the squib 90 and the ignitable material 122 in the movable container 104 are variables that determine the rate at which the pressure will increase in the space 160 between the squib 90 and the movable container 104. The rate at which the pressure increases in the space 160 will affect the time at which and the speed with which the movable container 104 enters the storage chamber 18. The speed with which the movable container 104 moves through the mixture of gases, and the amount of the ignitable material 122 which continues to burn as the movable container 104 moves through the mixture of gases will, in turn, affect the amount of and rate at which the combustion products are dispersed in the mixture of gases to ignite the combustible gas in the mixture.

Although the preferred embodiment of the present invention uses a combustible gas to provide the heat which further pressurizes the inflation fluid in the storage chamber 18, an alternative embodiment of the invention could use a solid ignitable material which, when burning inside the storage chamber 18, heats and further pressurizes the stored inflation fluid with the same result.

When the inflator assembly 10 is actuated as described above, it controls the flow rate at which the pressurized gas exits the storage chamber 18, and thus controls the flow rate at which the pressurized gas enters the air bag 12 to inflate the air bag 12. Such control enables the air bag 12 to be inflated to a predetermined internal gas pressure at a predetermined time following actuation of the inflator assembly 10 upon the occurrence of a vehicle collision. Thus, the inflator output is tailorable.

Specifically, the mixture of gases in the storage chamber 18 is first ignited and released to exit the storage chamber 18 upon formation of the first orifice 172. The mixture of combusted gases then begins to flow outward through the first orifice 172 at a first flow rate. The first flow rate is determined in part by the flow area of the first orifice 172, and in part by the pressure at which the mixture of gases is stored in the storage chamber 18. When the mixture of gases enters the air bag 12 to begin inflating the air bag 12, the internal gas pressure of the air bag 12 begins to increase at a rate which is related to the first flow rate through the first orifice 172.

When the second orifice 186 is formed, the mixture of gases suddenly begins to exit the storage chamber 18 at a second, greater flow rate. The second flow rate is greater than the first flow rate because the second orifice 186 is substantially larger than the first orifice 172, and because the mixture of gases has then attained a greater pressure inside the storage chamber 18. The internal gas pressure of the air bag 12 then begins to increase more rapidly at a rate which is related to the second, greater flow rate through the second orifice 186.

As described above, the second orifice 186 is not formed until the gas pressure in the storage chamber 18 reaches a predetermined elevated level as a result of continued combustion in the storage chamber 18. The second orifice 186 is then formed as the break away portion 58 of the closure wall 46 is severed and moved away from the rim portion 60 by the force resulting from the elevated pressure. Therefore, the internal gas pressure of the air bag 12 is increased at a relatively low rate by gas flowing through the first orifice 172 for the period of time during which the pressure inside the storage chamber 18 is being increased toward the predetermined elevated level. That period of time is predetermined and precisely controlled. As a result, the internal gas pressure of the air bag 12 is increased at a relatively low rate throughout a predetermined period of time following formation of the first orifice 172, and is suddenly increased at a greater rate by the greater amount of gas that subsequently flows through the second orifice 186. The inflator assembly 10 thus enables the air bag 12 to attain a predetermined internal gas pressure at a predetermined time. For example, for first and second orifices 172 and 186 of given flow areas, formation of the second orifice 186 at a relatively later time will cause the internal gas pressure of the inflating air bag 12 to reach a maximum value at a relatively later time because the greater flow of gas through the second orifice 186 begins later.

Factors that affect the time at which the second orifice 186 is formed include the initial storage pressure of the mixture of gases, the amount of the combustible gas in the mixture, and the strength and thickness of the material of the closure wall 46 which comprises the stress riser. These factors together affect the time required for the mixture of gases in the storage chamber 18 to become pressurized sufficiently to form the second orifice 186 by rupturing the stress riser. The amount of gas that exits the storage chamber 18 through the first orifice 172, as determined by the flow area of the first orifice 172 and the initial storage pressure, also affects the time required for the gas remaining in the storage chamber 18 to become pressurized sufficiently. The flow area of the first orifice 172 is, in turn, determined by the cross-sectional area of the movable container 104. Thus, subject to the limitations imposed by the diameter of the guide portion 74 of the actuator housing 70 and the need to have a relatively gas-tight seal between the movable container 104 and the guide portion 74, the cross-sectional area of the movable container 104 can be varied to vary the flow area of the first orifice 172 without changing other dimensions of the inflator assembly 10. Other factors affecting the time at which the second orifice 186 is formed include those discussed above concerning ignition of the combustible mixture of gases by the combustion products produced by the actuator assembly 16.

Figure 7:
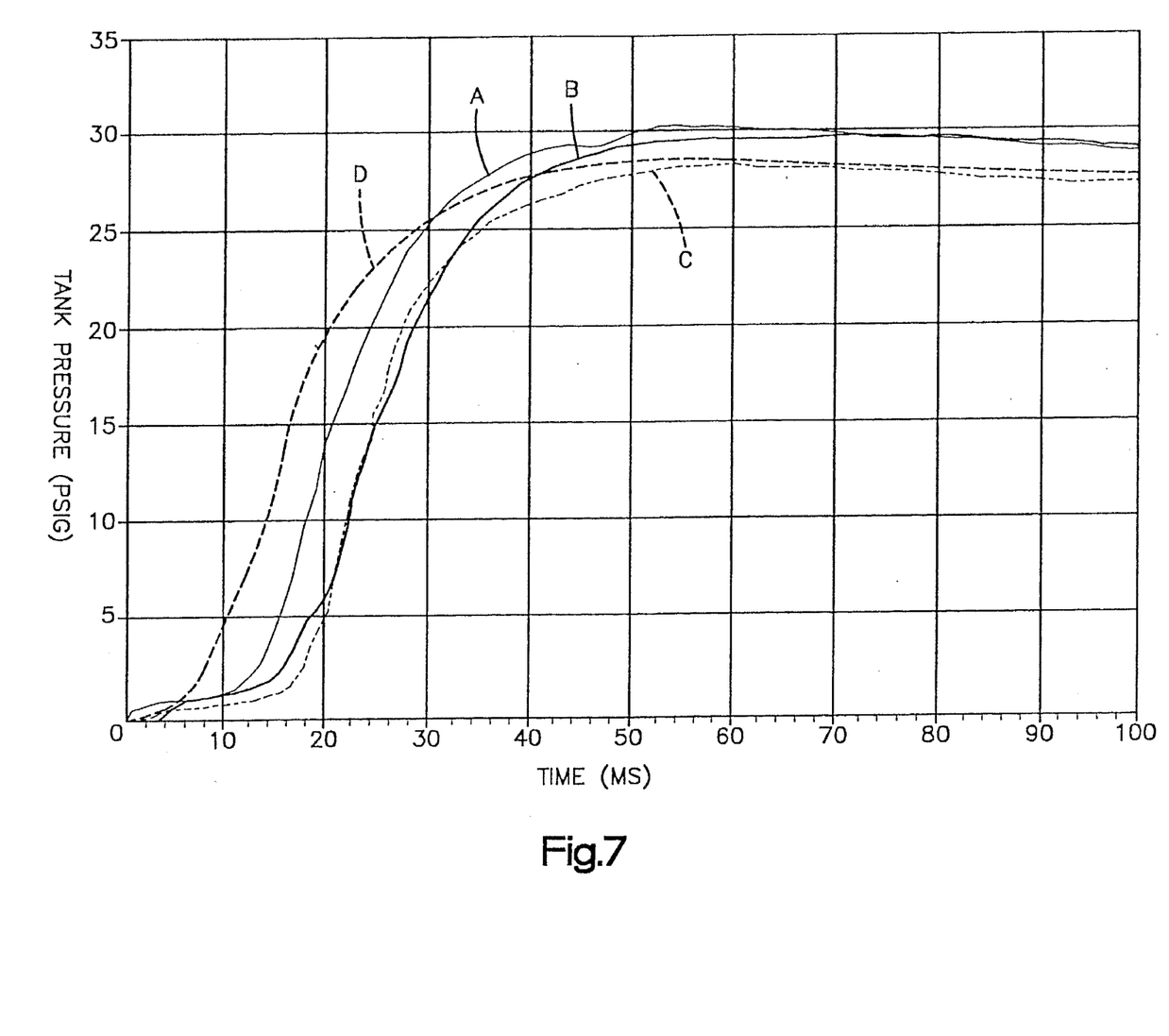
FIG. 7 is a graph showing performance data obtained upon actuation of test inflator assemblies.

The foregoing manner in which the inflator assembly 10 controls inflation of the air bag 12 is illustrated graphically in FIG. 7. Each of the curves A, B and C shown in FIG. 7 represents performance data obtained upon actuation of a respective test apparatus constructed in accordance with the present invention. Each test apparatus comprised an inflator assembly including a pressure vessel with an actuator assembly like the pressure vessel 14 and the actuator assembly 16. Each test apparatus was thus designed to provide first and second orifices in the same size, shape and sequence as described above with reference to the first and second orifices 172 and 186. Rather than directing gas into an air bag like the air bag 12, each test apparatus directed gas into a tank in which the gas pressure was measured as the gas entered the tank. Each of the curves A, B and C thus represents the internal gas pressure to be expected over time in an air bag like the air bag 12 following formation of the first orifice 172 in the inflator assembly 10.

The first curve A shows tank pressure to increase relatively slowly for approximately 11 milliseconds following formation of the first orifice in the first test apparatus. The first curve A thus indicates a relatively lesser amount of gas flowing into the tank through the first orifice during that period of time. The first curve A further shows the tank pressure to increase more rapidly thereafter, and thus indicates that the second orifice was formed at approximately 11 milliseconds after formation of the first orifice, with a greater amount of gas beginning to flow into the tank at that time. The tank pressure subsequently reached a maximum level at approximately 54 milliseconds after formation of the first orifice.

The second and third curves B and C similarly indicate formation of second orifices at approximately 14 and 16 milliseconds, with maximum tank pressures subsequently being reached at approximately 58 and 60 milliseconds, respectively. As compared with the second and third curves B and C, the first curve A shows a slightly earlier formation of the second orifice and a slightly earlier attainment of maximum tank pressure. This is attributable to a greater amount of combustible gas (hydrogen) in the mixture of gases used in the first test apparatus. The greater amount of combustible gas reduced the time required for the mixture of gases to become pressurized sufficiently to form the second orifice by rupturing the stress riser in the closure wall of the pressure vessel. The first curve A thus verifies that the amount of combustible gas is a controlling factor affecting the time at which the second orifice is formed in accordance with the present invention, as noted above. Moreover, the closeness of the second and third curves B and C shows the repeatability of results obtainable from inflator assemblies that are designed to control inflation of an air bag in the same predetermined manner in accordance with the present invention.

In practice of the present invention, it is preferable to form the second orifice at least approximately 8 milliseconds after forming the first orifice. It is most preferable to form the second orifice at a time within the range of 10–20 milliseconds after forming the first orifice.

A fourth curve D also is shown in FIG. 7. The fourth curve D represents performance data obtained upon actuation of a test apparatus comprising an inflator assembly constructed with a conventional burst disk. Specifically, the inflator assembly included a pressure vessel which differed from the pressure vessel 14 in that the pressure vessel did not include a closure wall like the closure wall 46. Instead, the pressure vessel included a conventional burst disk designed to rupture along score lines on the burst disk. The score lines extended radially over the burst disk in a cruciform pattern which defined a plurality of petal shaped sections of the burst disk located between the score lines.

When the inflator assembly with the burst disk was actuated, a movable container like the movable container 104 was projected through the burst disk. A first gas outlet opening was thus formed with the same flow area and shape as the first orifice 172 in the inflator assembly 10. The mixture of gases then began to flow from the storage chamber through the first gas outlet opening and into the tank at a first flow rate. The force of the increasing gas pressure inside the storage chamber subsequently ruptured the burst disk along the score lines and bent the petal shaped sections of the burst disk outwardly and away from each other. A second gas outlet opening was thus formed in the space extending between the petal shaped sections of the ruptured burst disk. The pressurized mixture of gases then began to flow from the storage chamber through the second gas outlet opening and into the tank at a second, greater flow rate.

Unlike the flow of gas through the second orifice 186 in the inflator assembly 10, the flow of gas through the second gas outlet opening in the inflator assembly using the burst disk depended on the manner in which the petal shaped sections of the burst disk bent outwardly and away from each other. As a result, the gas flowing from the storage chamber in the inflator assembly was not controlled in the manner described above with reference to the apparatus 10.

From the foregoing description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. Apparatus for inflating an inflatable vehicle occupant restraint, said apparatus comprising:

pressure vessel means for defining a chamber for containing gas under pressure;

a combustible mixture of gases contained in said chamber;

igniter means for increasing the pressure of said mixture of gases by igniting said mixture of gases;

outlet means for releasing gas to exit said chamber at a first flow rate and subsequently at a second, greater flow rate, said outlet means providing a first gas outlet opening in said pressure vessel means to open said pressure vessel means when said outlet means is actuated, said outlet means providing a second gas outlet opening in said pressure vessel means at a predetermined time after providing said first gas outlet opening; and directing means for directing gas from said gas outlet openings into the vehicle occupant restraint;

said pressure vessel means including a closure wall which closes said pressure vessel means, said outlet means including a projectile member with a circular cross section, said outlet means, when actuated, projecting said projectile member forcefully through said closure wall along with burning gases and particulates to puncture said first gas outlet opening through said closure wall in the size and shape of said circular cross section, said first gas outlet opening thus having a predetermined flow area equal to the area of said circular cross section.

2. Apparatus as defined in claim 1 wherein said outlet means further projects said projectile member followed by burning gases and particulates into said chamber to a location spaced inward from said closure wall, said projectile member containing an ignitable material which spews additional combustion products into said mixture of gases to ignite said mixture of gases inside said chamber when said projectile member moves from said closure wall to said location spaced inward from said closure wall.

3. Apparatus for inflating an inflatable vehicle occupant restraint, said apparatus comprising:

pressure vessel means for defining a chamber for containing gas under pressure;

a combustible mixture of gases contained in said chamber;

igniter means for increasing the pressure of said mixture of gases by igniting said mixture of gases;

outlet means for releasing gas to exit said chamber at a first flow rate and subsequently at a second, greater flow rate, said outlet means providing a first gas outlet opening in said pressure vessel means to open said pressure vessel means when said outlet means is actuated, said outlet means providing a second gas outlet opening in said pressure vessel means after providing said first gas outlet opening, said second gas outlet opening having a predetermined flow area; and directing means for directing gas from said gas outlet openings into the vehicle occupant restraint;

said pressure vessel means including a closure wall which closes said pressure vessel means, said outlet means including a projectile member with a circular cross section, said outlet means, when actuated, projecting said projectile member forcefully through said closure wall along with burning gases and particulates to puncture said first gas outlet opening through said closure wall in the size and shape of said circular cross section, said first gas outlet opening thus having a predetermined flow area equal to the area of said circular cross section.

4. Apparatus as defined in claim 3 wherein said outlet means further projects said projectile member followed by burning gases and particulates into said chamber to a location spaced inward from said closure wall, said projectile member containing an ignitable material which spews additional combustion products into said mixture of gases to ignite said mixture of gases inside said chamber when said projectile member moves from said closure wall to said location spaced inward from said closure wall.

5. Apparatus for inflating an inflatable vehicle occupant restraint, said apparatus comprising:

pressure vessel means for defining a chamber for containing inflation fluid under pressure, said pressure vessel means including a closure wall;

actuator means for entering said chamber and for increasing the fluid pressure inside said chamber;

said closure wall having a break away portion which is urged to move from said closure wall by said fluid pressure, said break away portion of said closure wall having a predefined peripheral boundary defined by a rupturable portion of said closure wall;

said rupturable portion of said closure wall being ruptured by said fluid pressure when said fluid pressure is increased by said actuator means, said rupturable portion thus releasing said break away portion to separate completely from said closure wall at said boundary and to move away from said closure wall to form a gas outlet opening within said boundary; and directing means for directing inflation fluid from said gas outlet opening into the vehicle occupant restraint;

said gas outlet opening being a second opening, said actuator means including means for forming a first gas outlet opening through said break away portion of said closure wall before said second opening is formed;

said actuator means including a projectile member with a circular cross section, said actuator means, when actuated, projecting said projectile member forcefully through said break away portion of said closure wall along with burning gases and particulates to puncture said first opening through said break away portion in the size and shape of said circular cross section, said actuator means further projecting said projectile member followed by burning gases and particulates into said chamber to a location spaced inward from said closure wall.

6. Apparatus as defined in claim 5 wherein said chamber contains an inflation fluid comprising a combustible mixture of gases, said projectile member containing an ignitable material which spews additional combustion products into said combustible mixture of gases to ignite said combustible mixture of gases inside said chamber when said projectile member moves from said closure wall to said location spaced inward from said closure wall.

7. Apparatus as defined in claim 5 wherein said chamber contains an inflation fluid comprising a combustible mixture of gases.

8. Apparatus for inflating an inflatable vehicle occupant restraint, said apparatus comprising:

pressure vessel means for defining a sealed chamber for containing inflation fluid under pressure, said pressure vessel means including a rupturable closure wall which closes said pressure vessel means to block the flow of inflation fluid outward from said chamber past said closure wall;

actuator means for entering said chamber in a first direction extending into said chamber and for increasing the fluid pressure inside said chamber;

said closure wall having a break away portion which is urged by said fluid pressure to move from said closure wall in a second direction opposite to said first direction, said closure wall further including means for defining a stress riser, said stress riser circumscribing said break away portion to define a peripheral boundary of said break away portion and to define a predetermined surface area of said break away portion within said boundary;

said stress riser being ruptured by said fluid pressure inside said chamber when said fluid pressure has been increased by said actuator means, said closure wall thus releasing said break away portion to separate completely from said closure wall at said boundary and to move away from said closure wall in said second direction to form a gas outlet opening within said boundary, said gas outlet opening having a predetermined flow area equal to said predetermined surface area; and directing means for directing inflation fluid from said gas outlet opening into the vehicle occupant restraint.

9. Apparatus as defined in claim 8 wherein said gas outlet opening is a second opening, said actuator means forming a first gas outlet opening through said break away portion of said closure wall to open said sealed chamber before said second opening is formed.

10. Apparatus as defined in claim 8 wherein said closure wall has a circular shape centered on an axis, said fluid pressure inducing a bending moment in said closure wall which decreases from a maximum value at said axis to a value of zero at a critical radial distance from said axis, said stress riser extending circumferentially around said axis and defining said peripheral boundary of said break away portion in a circular shape at said critical radial distance from said axis.

11. Apparatus as defined in claim 8 wherein said means for defining a stress riser includes surface means for defining said gas outlet opening as an orifice which is tapered in a direction outward from said chamber upon rupturing of said stress riser.

12. Apparatus as defined in claim 11 wherein said boundary is circular, said surface means including an inner surface of said closure wall which has an annular edge circumscribing said break away portion at said boundary, said edge of said inner surface having a curved radial profile which decreases in diameter as said profile approaches said boundary in a direction outward of said chamber.

13. Apparatus as defined in claim 11 wherein said orifice has a coefficient of contraction of at least about 0.90.

14. Apparatus as defined in claim 11 wherein said orifice has a coefficient of contraction of about 0.97–0.98.

15. A method of inflating an inflatable vehicle occupant restraint, said method comprising the steps of:
provide a combustible mixture of gases in a sealed chamber defined by a pressure vessel, said pressure vessel having a rupturable closure wall means for closing said pressure vessel to block the flow of said gases outward from said chamber past said rupturable closure wall means;
opening said pressure vessel by rupturing said rupturable closure wall means to provide a first flow area through which gas exits said chamber for flow into the restraint;
directing gas to flow into the restraint through said first flow area;
igniting said combustible mixture of gases;
further rupturing said rupturable closure wall means to provide a second flow area through which gas exits said chamber for flow into the restraint, said second flow area being provided after gas exits said chamber and flows into the restraint through said first flow area; and
directing gas to flow into the restraint through said second flow area.

16. A method as defined in claim 15 wherein said second flow area is provided at a predetermined time after said first flow area is provided.

17. A method as defined in claim 16 wherein said predetermined time is at least approximately 8 milliseconds.

18. A method as defined in claim 16 wherein said predetermined time is within the range of approximately 10–20 milliseconds.

19. A method as defined in claim 15 wherein said second flow area is greater than said first flow area.

20. A method as defined in claim 15 wherein said step of rupturing said rupturable closure wall means to provide said first flow area includes the step of rupturing said rupturable closure wall means in a circular configuration centered on an axis, said step of further rupturing said rupturable closure wall means to provide said second flow area including the step of rupturing said rupturable closure wall means in a circular configuration centered on said axis and at a diameter greater than the diameter of said first flow area.

21. A method as defined in claim 15 wherein said step of igniting said combustible mixture of gases causes the gas pressure in said chamber to reach a predetermined elevated level, said rupturable closure wall means being ruptured to provide said second flow area in response to said pressure reaching said predetermined elevated level.

22. Apparatus for inflating an inflatable vehicle occupant restraint, said apparatus comprising:
a pressure vessel having a closed chamber containing inflation fluid under pressure, said pressure vessel having rupturable closure means for closing said chamber to block said inflation fluid from exiting said chamber, said chamber being opened upon rupturing of said closure means;
means for increasing the pressure of said inflation fluid in said chamber;
outlet means for causing said closure means to rupture a first time so as to provide a first outlet opening in said closure means, said first outlet opening enabling said inflation fluid to exit said chamber at a first exit flow rate;
said outlet means subsequently causing said closure means to rupture a second time under the influence of said pressure when said pressure has been increased, said outlet means thereby providing a second outlet opening in said closure means after said providing said first outlet opening, said second outlet opening enabling said inflation fluid to exit said chamber at a second, greater exit flow rate; and
directing means for directing inflation fluid from said first outlet opening to enter the vehicle occupant restraint at a first entry flow rate, and for subsequently directing inflation fluid from said second outlet opening to enter the vehicle occupant restraint at a second, greater entry flow rate.

23. Apparatus as defined in claim 22 wherein said outlet means provides said second outlet opening at a predetermined time after providing said first outlet opening.

24. Apparatus as defined in claim 23 wherein said predetermined time is at least approximately 8 milliseconds after the time when said outlet means provides said first outlet opening.

25. Apparatus as defined in claim 23 wherein said predetermined time is within the range of approximately 10–20 milliseconds after the time when said outlet means provides said first outlet opening.

26. Apparatus as defined in claim 22 wherein said second outlet opening has a predetermined flow area.

27. Apparatus as defined in claim 26 wherein said first outlet opening has a predetermined flow area.

28. Apparatus as defined in claim 27 wherein said flow area of said second outlet opening is greater than said flow area of said first outlet opening.

29. Apparatus as defined in claim 27 wherein said flow area of said second outlet opening includes said flow area of said first outlet opening.

30. Apparatus as defined in claim 27 wherein said first outlet opening has a circular shape centered on an axis, said second outlet opening having a circular shape centered on said axis and having a diameter greater than the diameter of said first outlet opening.

31. Apparatus as defined in claim 22 wherein said outlet means provides said second outlet opening in response to said pressure reaching a predetermined elevated level.

32. Apparatus as defined in claim 31 wherein said closure means has a break away portion which is urged to move from said closure means by said pressure, said break away portion of said closure means having a predefined peripheral boundary defined by a rupturable portion of said closure means, said rupturable portion of said closure means being ruptured by said pressure when said pressure reaches said predetermined elevated level, said rupturable portion thus releasing said break away portion to separate completely from said closure means at said boundary and to move away from said closure means to form said second outlet opening within said boundary.

33. Apparatus as defined in claim 22 wherein said outlet means comprises a projectile member for providing said first outlet opening by puncturing said closure means upon impact with said closure means.

34. Apparatus as defined in claim 33 wherein said outlet means comprises a stress riser portion of said closure means which is ruptured by said pressure to provide said second outlet opening when said pressure has been increased.

35. Apparatus for inflating an inflatable vehicle occupant restraint, said apparatus comprising:

pressure vessel means for defining a chamber for containing gas under pressure, said pressure vessel means including a closure wall which closes said chamber;

a combustible mixture of gases contained in said chamber;

igniter means for increasing the pressure of said mixture of gases by igniting said mixture of gases;

outlet means for releasing gas to exit said chamber at a first flow rate and subsequently at a second, greater flow rate, said outlet means providing a first gas outlet opening in said closure wall to open said chamber, said outlet means subsequently providing a second gas outlet opening in said closure wall after providing said first gas outlet opening; and directing means for directing gas from said gas outlet openings into the vehicle occupant restraint;

said outlet means including a projectile member and means for projecting said projectile member forcefully through said closure wall to puncture said first gas outlet opening through said closure wall.

36. Apparatus as defined in claim 35 wherein said outlet means further projects said projectile member to a location spaced inward from said closure wall, said projectile member carrying said igniter means into said chamber to cause said igniter means to ignite said mixture of gases inside said chamber, said outlet means providing said second gas outlet opening in response to said pressure when said pressure has been increased by said igniter means.

* * * * *